B. F. DAVIS.
HEAT DISTRIBUTER OR BAKE OVEN FOR GAS AND GASOLENE STOVES.
APPLICATION FILED NOV. 8, 1912.
1,079,219.
Patented Nov. 18, 1913.
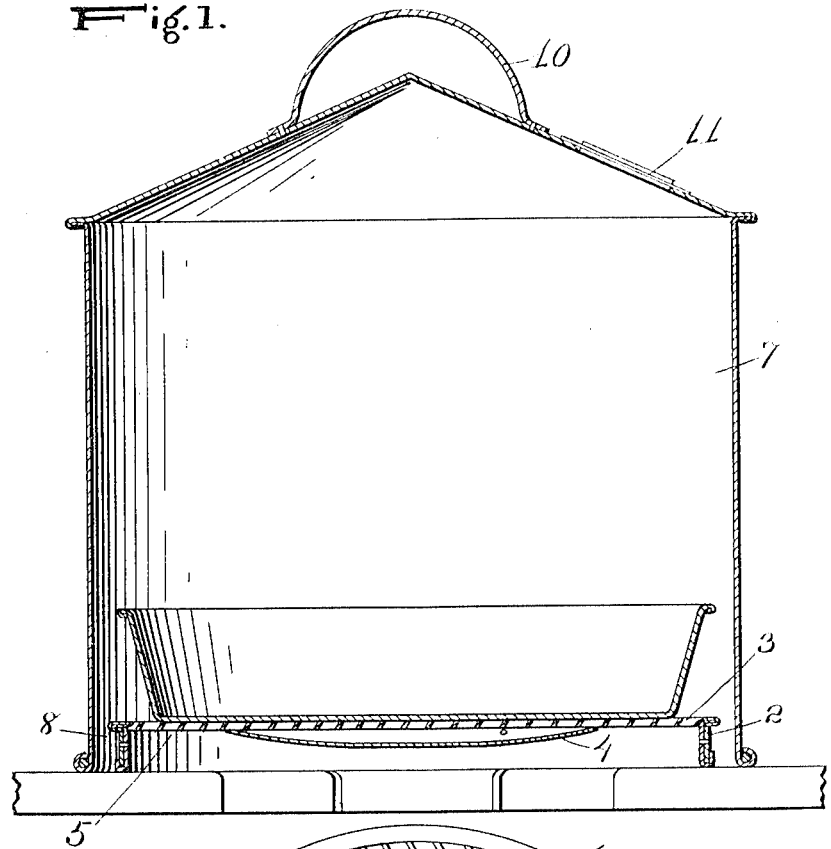
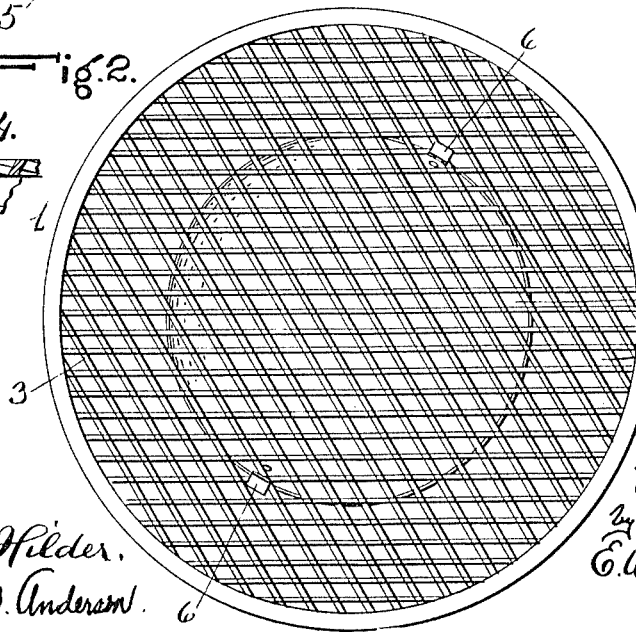
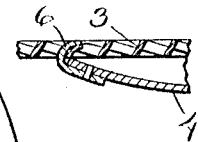

UNITED STATES PATENT OFFICE.

BENJAMIN F. DAVIS, OF WASHINGTON, DISTRICT OF COLUMBIA, ASSIGNOR, BY MESNE ASSIGNMENTS, TO JAMES M. HIMES, OF WASHINGTON, DISTRICT OF COLUMBIA.

HEAT-DISTRIBUTER OR BAKE-OVEN FOR GAS AND GASOLENE STOVES.

1,079,219.  Specification of Letters Patent.  Patented Nov. 18, 1913.

Application filed November 8, 1912. Serial No. 730,286.

*To all whom it may concern:*

Be it known that I, BENJAMIN F. DAVIS, a citizen of the United States, resident of Washington, in the District of Columbia, have made a certain new and useful Invention in Heat-Distributers or Bake-Ovens for Gas and Gasolene Stoves; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to bake ovens for gas and gasolene stoves, designed to be removably placed over the top burner of the stove, and having for its object to provide an improved base or heat distributer of simple and effective nature.

The invention consists in the novel construction and combinations of parts as hereinafter set forth.

In the accompanying drawings illustrating the invention, Figure 1 is a vertical central section of the invention as applied; Fig. 2 is a top plan view of the distributer; Fig. 3 is a detail fragmentary sectional view of the deflector plate and the screen, showing the screen and plate connection; and Fig. 4 is a similar view showing the air passage over the marginal edge of the deflector plate.

In these drawings the numeral 1, designates the oven base or heat distributer, which is composed of an upright support 2 preferably consisting of a vertical cylindrical rim; a horizontal perforated circular screen 3, secured at its edge to the upper edge of said rim and extending entirely across said base, said screen consisting preferably of the metal known as expanded metal being of meshed character, the perforations or meshes of which are comparatively large, and the upstanding inclined walls between the perforations of which are comparatively thin and high and yet strong and light; and a concavo-convex or dished horizontal circular deflector plate 4, underlying said screen and of a diameter smaller than that of the screen to leave a marginal interval 5, between the rim 2 and the edge of said plate, the marginal portion of the screen overlying said interval, and said plate being secured in place preferably by means of lug extensions 6, thereof, extending up within perforations of the screen and bent inward over the inner walls of said perforations. The upper marginal edge of the deflector plate 4, is thin, and this thin edge has contact with the lower surface of the screen 3, bridging the perforations or meshes of the screen.

The cooking vessel is designed to rest upon the screen, and the base and cooking vessel are covered by a hood or oven 7, closed at the top and sides and open at the bottom, the lower edge of said bottom being designed to rest upon the top of the stove about on a level with the lower edge of the rim flange 2. The diameter of the hood or its bottom is preferably greater than that of the base or heat distributer, to leave an annular interval 8, between the inner wall of the hood and the rim 2.

The flame from the burner is designed to strike upward against the convex bottom of the deflector plate, which will spread the flame in an even manner and protect the perforated screen from contact with the flame. The air above the dished top of the deflector plate will become highly heated and circulation will occur between the bottom of the vessel and the edge of said plate into the space 5 between plate and rim flange 2, around and upward in contact with the cooking vessel resting upon the screen.

The circulation of the heated air from the interior of the dished deflector plate into the annular space between said plate and the cylindrical rim 2, is facilitated by the upstanding narrow thin edge walls between the projections or meshes of the screen 3, and the thin upper marginal edge of the deflector plate, said marginal thin edge while being in contact with the lower surface of the screen and bridging the screen perforations or meshes, yet allowing a free circulation of the heated air over its thin marginal edge, through the perforations or meshes that are bridged by said marginal edge (see Fig. 4 of the drawings).

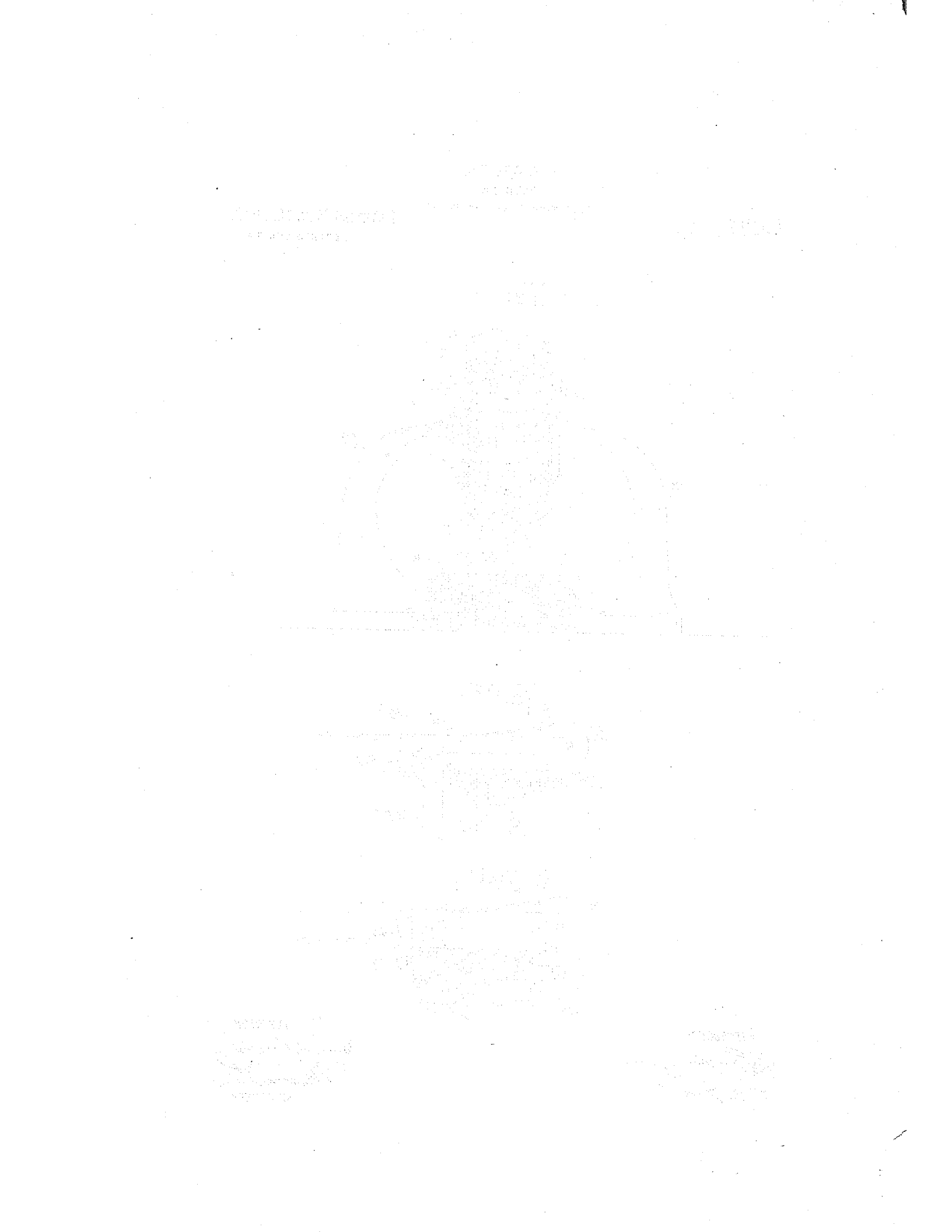

Inasmuch as the edge of the deflector plate is located below the screen and the narrow upstanding thin edge walls and air passages formed thereby separate it from the bottom of the cooking vessel, the contents of said vessel will be prevented from burning. The circulation of the heated air above the dished top of the deflector plate outward and up-